United States Patent
Greaney et al.

(10) Patent No.: US 10,500,766 B2
(45) Date of Patent: *Dec. 10, 2019

(54) MOLD AND ASSOCIATED METHODS

(71) Applicant: Taylor Made Golf Company, Inc., Carlsbad, CA (US)

(72) Inventors: Mark Vincent Greaney, Vista, CA (US); Bing-Ling Chao, San Diego, CA (US); Herbert Stanley Heffernan, III, Oceanside, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/033,976

(22) Filed: Jul. 12, 2018

(65) Prior Publication Data

US 2018/0361628 A1  Dec. 20, 2018

Related U.S. Application Data

(63) Continuation of application No. 14/469,123, filed on Aug. 26, 2014, now Pat. No. 10,046,484.

(60) Provisional application No. 61/885,795, filed on Oct. 2, 2013.

(51) Int. Cl.
| | |
|---|---|
| *B29C 33/38* | (2006.01) |
| *B29C 33/40* | (2006.01) |
| *B29C 33/42* | (2006.01) |
| *B29K 61/00* | (2006.01) |
| *B29K 75/00* | (2006.01) |
| *B29L 31/52* | (2006.01) |

(52) U.S. Cl.
CPC .......... *B29C 33/3857* (2013.01); *B29C 33/40* (2013.01); *B29C 33/424* (2013.01); *B29K 2061/00* (2013.01); *B29K 2075/00* (2013.01); *B29L 2031/5227* (2013.01)

(58) Field of Classification Search
CPC .................................................. B29C 33/444
USPC .......................................................... 264/220
See application file for complete search history.

(56) References Cited

U.S. PATENT DOCUMENTS

| | | | | |
|---|---|---|---|---|
| 6,258,183 | B1 * | 7/2001 | Onuki ................... | A63B 53/04 148/403 |
| 2008/0039230 | A1 * | 2/2008 | Lin ......................... | A63B 53/04 473/342 |
| 2008/0087793 | A1 * | 4/2008 | Shepheard .......... | B29C 33/3857 249/80 |
| 2009/0005191 | A1 * | 1/2009 | Lin ..................... | A63B 53/0466 473/331 |
| 2009/0318243 | A1 * | 12/2009 | Golden ................. | A63B 53/047 473/331 |
| 2011/0045922 | A1 | 2/2011 | Hackel | |
| 2014/0294556 | A1 * | 10/2014 | Sandercock ........... | B23Q 3/063 414/806 |

* cited by examiner

Primary Examiner — Matthew J Daniels
Assistant Examiner — Hana C Page
(74) Attorney, Agent, or Firm — Klarquist Sparkman LLP (57) ABSTRACT

A method of producing a mold includes obtaining a master mold, the master mold including surface details; exposing a curable material to the surface details; and curing the curable material with the surface details. A mold includes a surface for molding a composite part, the surface including surface details, wherein the mold is made of phenolic material.

16 Claims, 8 Drawing Sheets

MOLD AND ASSOCIATED METHODS

CROSS-REFERENCE TO RELATED APPLICATIONS

This application is a continuation of currently pending U.S. patent application Ser. No. 14/469,123, filed Aug. 26, 2014, which claims priority to U.S. Provisional Patent Application No. 61/885,795, filed Oct. 2, 2013, which applications are hereby incorporated herein by reference in their entirety.

This application incorporates by reference the following United States Patents and United States Patent Applications: U.S. patent application Ser. No. 13/472,811, filed on May 16, 2012, and entitled "GOLF CLUB HEAD WITH FACE INSERT," which is incorporated by reference herein in its entirety and with specific reference to the process of electroforming surface profiles; U.S. patent application Ser. No. 11/960,609, filed Dec. 19, 2007, and entitled "METHOD OF CREATING SCORELINES IN CLUB FACE INSERT" which is incorporated by reference herein in its entirety and with specific reference to composite faces, cover layers, and use of polyurethane; and, U.S. patent application Ser. No. 13/111,715, filed May 19, 2011, and entitled "TEXTURED GOLF CLUB FACE" which is incorporated by reference herein in its entirety and with specific reference to composite faces, cover layers, use of polyurethane, and microtexturing.

TECHNICAL FIELD

This application relates to manufacturing golf club faces. Specifically, this application relates to production of high-precision golf club faces.

BACKGROUND

Modern golf club heads—particularly driver-type golf club heads—are often designed to maximize distance. Various aspects of the golf club head may also be altered, including weight and placement of weight throughout the head, including reduction in thickness of various walls and components of the golf club head. However, golf club heads of the current design are limited by structural integrity. Some golf club designs may be light and include various placement of weight, but golf clubs may be limited in design by the ability to withstand multiple strikes with durability. As such, a weight threshold exists for golf club heads of a certain size below which the durability would be compromised.

SUMMARY

A method of producing a mold includes obtaining a master mold, the master mold including surface details; exposing a curable material to the surface details; and curing the curable material with the surface details. A mold includes a surface for molding a composite part, the surface including surface details, wherein the mold is made of phenolic material.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Disclosed is a golf club head including a composite face and associated methods, systems, devices, and various apparatus. It would be understood by one of skill in the art that the disclosed golf club head and associated systems, device, and apparatus are described in but a few exemplary embodiments among many. No particular terminology or description should be considered limiting on the disclosure or the scope of any claims issuing therefrom.

Golf club heads of modern design are often designed with distance in mind. Particularly with respect to driver-type golf club heads, reduction in mass of the golf club head, coupled with maximum allowable Coefficient of Restitution (COR) of the golf club face, is a design goal. Metal wood type golf club heads are limited in size by the United States Golf Association (USGA) to 460 cubic centimeters maximum. It has become beneficial to provide a golf club head with maximum size at minimum weight, as the distance a golfer can hit a golf ball is often related to the weight of the golf club head. Additionally, even if minimum weight at maximum size is not a design goal, golf club designers may seek to move weight within the golf club head to achieve an exact location of the center of gravity (CG) of the golf club head.

A certain amount of mass is necessary in any golf club head design because of the nature of golf club heads. Golf club heads are typically designed to withstand multiple strikes of a golf ball, and, as such, the minimum mass of those golf club heads are the amount necessary to produce a structurally sound golf club head. Such basic amount of weight is required mass. Any mass above the required mass is considered discretionary mass, as it may be removed or relocated as desired by the golf club designer to achieve various performance characteristics.

Golf club heads with composite faces—such as the head disclosed in U.S. patent application Ser. No. 11/960,609, filed Dec. 19, 2007, and entitled "METHOD OF CREATING SCORELINES IN CLUB FACE INSERT"—include composite faces as one technological advance. Certain composites can be as strong as or stronger than titanium—the material that is typical among driver-type golf club heads—although such composites may be significantly lighter than titanium. Additionally, composites may provide a greater area of high COR across the face. More importantly, composites allow reduction of weight with similar performance to metals. As such, if a designer wishes to reduce or reposition weight in a golf club head, a composite face insert may allow the designer larger amounts of discretionary mass and reduced amounts of required mass.

However, a major challenge faced by golf club designers utilizing composite face technology is not in design, but in manufacture. To maintain durability of composite faces, it sometimes becomes necessary to provide a coating or layer. In various embodiments—such as those described in U.S. patent application Ser. No. 11/960,609—a cover layer of polyurethane may be used, although in various embodiments the coating or layer may be various materials, including epoxy and film adhesive, among others. Polyurethane covers may provide abrasion resistance but in some cases may still exhibit some abrasion. Even if abrasion is dramatically lessened by inclusion of a polyurethane cover, some abrasion may still exist and exhibit cosmetically. Additionally, various materials may create adverse spin effects if used on the golf club face. It becomes necessary to provide a coating or layer that can maintain the abrasion resistance and performance required for multiple golf shots while maintaining spin performance similar to metallic golf club heads.

One solution to the problem is to provide a microtextured face as described in U.S. patent application Ser. No. 13/111,715, filed May 19, 2011, and entitled "TEXTURED GOLF CLUB FACE". Such a solution allows the use of polyurethane but provides enhanced durability and prevents adverse spin effects. Additionally, the microtexture may reduce perceived damage to the user by effectively camouflaging any damage within a pattern. Microtextures may also be beneficial in various playing conditions so that the composite face may perform more like a metal face driver. Various microtexture profiles are possible and are used as described in U.S. patent application Ser. No. 13/111,715. To maintain a metallic performance while remaining within the USGA rules, it becomes necessary to provide such textures at high precision. Particularly with golf club faces including a microtexture as described in U.S. patent application Ser. No. 13/111,715, microtextures may approach precision on the order of a micrometre, which is also referred to as a micron ($1 \mu m = 1$ micron $= 1 \times 10^{-6}$ m). As one of skill in the art would understand, typical molds to form such texture are equally precise.

Machining molds to micron-level precision and accuracy with a conventional CNC milling approach is a time consuming and tedious task. To machine multiple molds with identical details so that every mold is the same (same dimensions of all surface textural details, same surface finish, and same reflectance) is extremely challenging. Some CNC shops can manufacture a mold to micron precision in about 8 hours. However, such molds often require reworking, as the level of precision required dictates very tight tolerances. Although the machining time of the initial mold is about 8 hours, many machine shops would struggle to produce two molds per week, and many machine shops may be incapable of creating repeatable molds from one tool to another.

In order to bring a popular driver-type golf club head to market in as a golf club, it is estimated that between 80 and 100 molds are required. Based on the estimated output mentioned above, a high precision 5-axis CNC milling machine would need to produce molds continuously for an entire year, during which time no other use of this machine is allowed. Such an enormous effort threatens to make a significant impact on creativity, human fatigue, errors due to repetition, and resource planning. Additionally, such an effort can be particularly expensive in the form of materials costs including large percentages of scrap, high labor costs, and high tooling costs. Further, tooling can be somewhat variable from piece to piece, so the molds produced may not be precisely the same and may include substantial variations in some cases.

As such, embodiments of the current disclosure provide a solution that allows the creation of high-precision molds capable of micron-level precision with reduced cycle times. The embodiments of the current disclosure are capable of creating molds in several minutes as compared to multiple hours or days using CNC. In various embodiments of the current disclosure, molds are capable of precise and nearly identical reproduction. Finally, materials costs are relatively inexpensive.

In the current disclosure, high-precision molds are produced through one of two processes: electroforming and phenolic molding.

A. Polyurethane Part Production

To understand some requirements of a typical mold of the current disclosure, it is important to understand the requirements of at least one manufacturing process to create a polyurethane coating or layer as part of a composite face plate.

To create a polyurethane coating or layer on a composite face plate, a composite face blank is exposed to polyurethane under pressure. Initially, the composite face blank is prefabricated via composite processing such as those discussed in U.S. patent application Ser. No. 13/111,715 or via other methods known in the art. In practice, the procedure for fabricating the composite face blank may be incorporated into the manufacturing processes described herein, and nothing in this disclosure should be construed to limit manufacturing steps to only those described herein.

The composite face blank is placed into a mold for molding the polyurethane. The polyurethane is applied to the composite face blank in the mold, and subject to 130° F. under 8 tons of force for 10 minutes. The mold is then released from the composite face plate including the composite face blank and polyurethane layer.

The polyurethane is manufactured by combining prepolymer, urethane, and UV inhibitor. Initially, prepolymer is heated. When the prepolymer is mixed with urethane and UV inhibitor, the polyurethane has an 80-second gel time. In one process, the prepolymer, urethane, and UV inhibitor is mixed for 30 seconds to ensure thorough distribution of the parts throughout the mix. In another process, a dynamic static mixer may be used to reduce the mix time to as little as 6 seconds (mixing and distributing at 1 gram per second for 6 seconds). The polyurethane is injected into the mold and formed at 8 tons for 10 minutes to ensure proper adhesion and full curing.

Given the requirements of the polyurethane part production, it is beneficial to create the mold of a material that can provide micron-level surface details while having sufficient durability to withstand 8-ton force in repeated cycles. Further, given the previously-described production demand requirements, it is beneficial to use a process for making the mold that can quickly and repeatedly produce molds of micron-level details.

B. Phenolic Molding

Phenolic molding provides precise reproduction of part geometries to micron-level precision at low cost. Certain phenolic materials are capable of withstanding 8-ton force upon repeated cycles without significant failure rates. Phenolic is capable of itself being molded to very precise surface details, including micron-level precision in some cases. Finally, the procedures described herein allow production of multiple molds with cycle times that are significantly faster than CNC production.

To achieve the results desired as described above, multiple phenolic molds are created from one or a few master molds. The phenolic molds are used to create the polyurethane part, which is the composite face plate. Because the cycle times of creating phenolic molds is on the order of minutes, it is not an onerous task to produce sufficient numbers of molds to support production.

Figure 1:
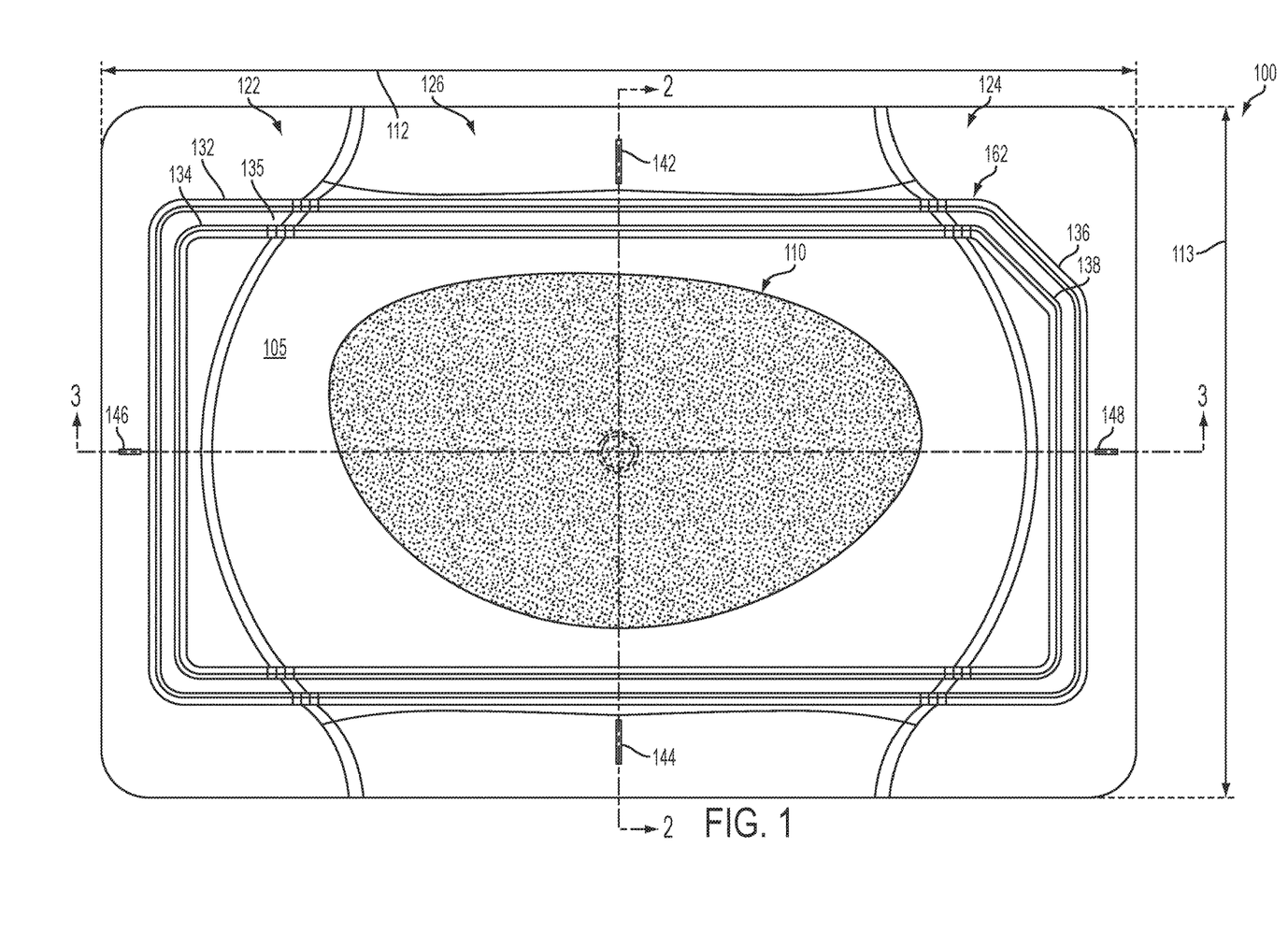
FIG. 1 is a front side view of a master mold in accord with one embodiment of the current disclosure.

A master mold 100 as seen in FIG. 1 is produced to micron-level precision using CNC processing. The master mold 100 includes details that are substantially the same as the desired polyurethane part, although in various embodiments, the master mold 100 may be somewhat variant to account for thermal expansion and contraction in the various molding processes. For example, in one embodiment, the master mold 100 may have dimensions at 103% of the desired dimensions to account for thermal contraction. The master mold 100 of the current embodiment includes a mold surface 105 containing surface details 110. In production of the phenolic mold, the mold surface 105 of the master mold 100 is in contact with phenolic material. Such contact allows reproduction of the intricate details of the surface profile.

The master mold 100 is of a length 112 of about 165 mm and width 113 of about 110 mm. As seen with reference to FIG. 2, the master mold 100 is of a nominal thickness 114 of about 36 mm and a total thickness 116 of about 42.10 mm. With returning reference to FIG. 1, the master mold 100 includes a first region 122, a second region 124, and a third region 126. In the current embodiment, each of the first region 122 and the second region 124 are disposed on outer ends of the master mold 100 with the third region 126 disposed between the first region 122 and the second region 124. In the current embodiment, each of the first region 122 and the second region 124 are generally flat in nature and do not include curvature, although varying embodiments may include varying features as desired. The third region 126 includes a curvature as can be seen with references to FIGS. 1-3. In the current embodiment, the curvature of the third region 126 substantially matches a roll and bulge radius of the desired polyurethane part or composite face plate. In various embodiments, the roll radius is about 12 inches and the bulge radius is about 14 inches, although in various embodiments the roll may be 9 inches to 14 inches and the bulge radius may be 10 inches to 18 inches. It should be noted that concentric dotted circles shown in the center of FIG. 1 are for reference and do not denote specific features found on the master mold 100.

The master mold 100 disclosed with respect to FIG. 1 includes surface details 110 in a centrally-located region of the master mold 100. In the current embodiment, the surface details 110 are included on the third region 126 only, although surface details 110 may extend outside the third region 126 in various embodiments.

In the current embodiment, the surface details 110 are located within a first rim 132. A second rim 134 generally follows the contour of the first rim 132 and is located within the first rim 132. The first rim 132 includes a keyed corner 136 and the second rim 134 includes a keyed corner 138, although keying features need not be limited to corners, and various embodiments may include various keying features. In the current embodiment, each of the first rim 132 and the second rim 134 are generally rectangular in shape, although various embodiments may include various shapes, including ovular shapes more closely associated with the shape of the surface details 110 or other various shapes. Each of the first rim 132 and the second rim 134 provides an angled surface to a trough 135 located therebetween. The surface details 110 in the current embodiment cover about ⅓ of the area inside the second rim 134.

The first rim 132, second rim 134, and trough 135 together form the shim mold 162. The shim mold 162 sets a thickness of a shim 620 on a mold 600 (see FIGS. 6 and 7A). The shim 620 is discussed in more detail with reference to FIG. 7A.

Returning to FIG. 1, the master mold 100 includes a first widthwise locating feature 142, a second widthwise locating feature 144, a first lengthwise locating feature 146, and a second lengthwise locating feature 148. The locating features 142,144,146,148 provide a location of the center for machining so that tooling can be aligned properly. In the current embodiment, each locating feature 142, 144, 146, 148 is a linear trough, although various embodiments may include various locating features of various shapes and sizes.

Figure 2:
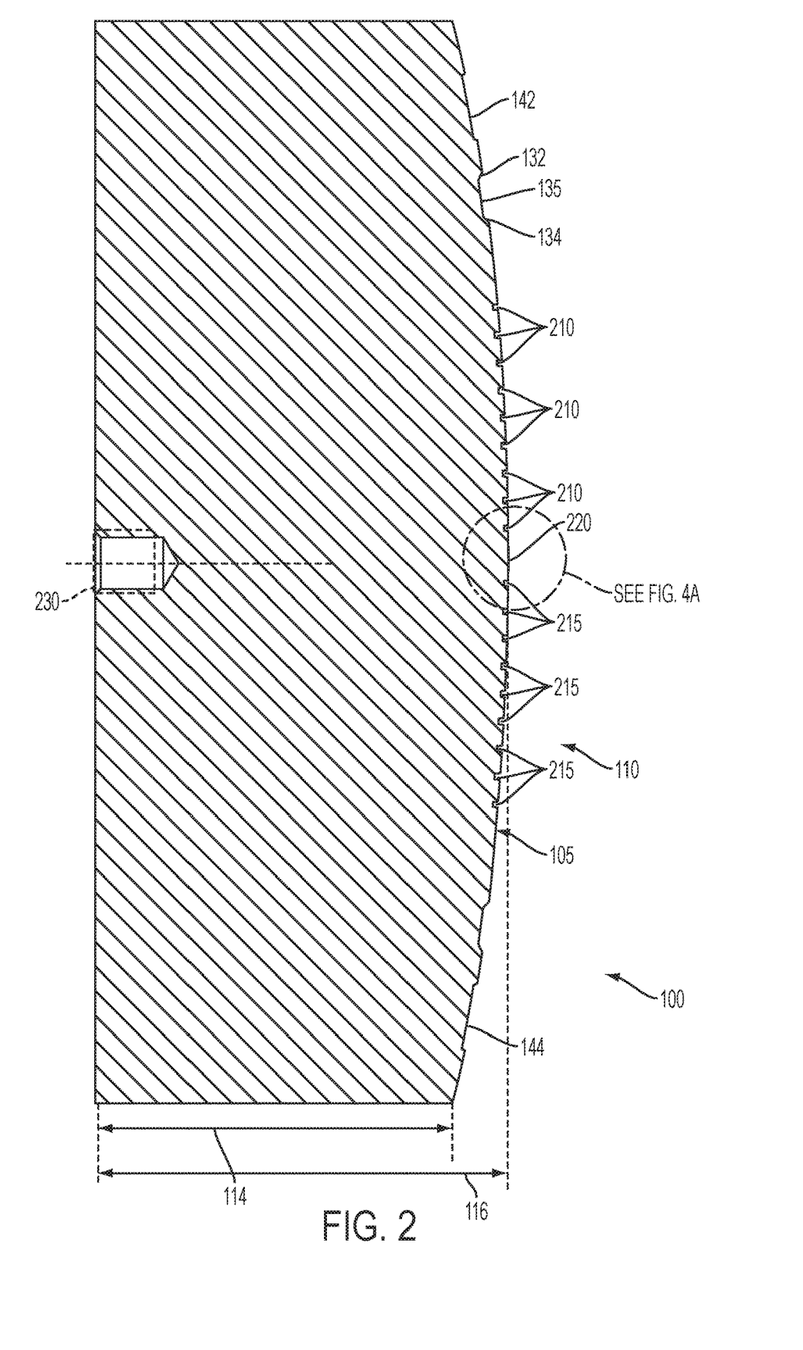
FIG. 2 is a cross-sectional view of the master mold of FIG. 1 taken along line 2-2 as drawn in FIG. 1.
Figure 3:
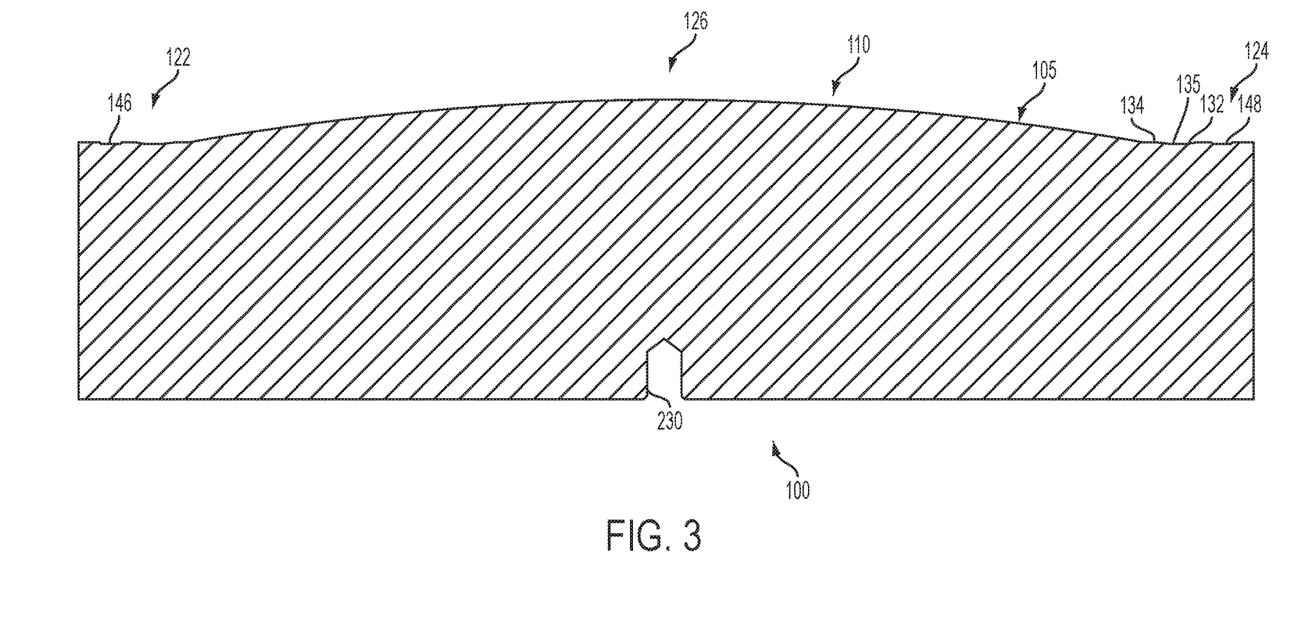
FIG. 3 is a cross-sectional view of the master mold of FIG. 1 taken along line 3-3 as drawn in FIG. 1.

As seen with reference to FIG. 2, the mold surface 105 is of about constant radius, excepting various features located on the mold surface 105. A plurality of upper grooves 210 and lower grooves 215 are shown. In the current embodiment, a characteristic time (CT) test pad 220 is located between the upper grooves 210 and the lower grooves 215. In the current embodiment, grooves are located on either side of the CT test pad 220 in addition to being located above and below the CT test pad 220. The CT test pad 220 is a break in grooves that allows measurement of characteristic time (CT). A notch 230 is shown in the view of the current embodiment. As seen with reference to FIG. 3, the master mold 100 is also of about constant radius, excepting various features located on the mold surface 105, including those previously discussed.

Figure 4A:
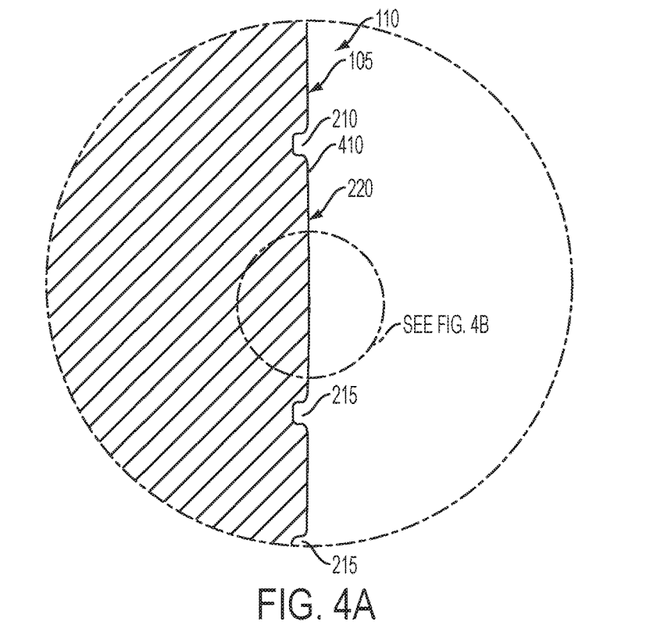
FIG. 4A is a detail view of detail 4A as indicated in FIG. 2.

As seen with reference to FIG. 4A, the surface details 110 located on the mold surface 105 include the upper grooves 210, the lower grooves 215, and a plurality of microgrooves 410 located between the various upper grooves 210, lower grooves 215, and on the CT test pad 220 between the upper grooves 210 and the lower grooves 215. To prevent obstruction of the view, only one microgroove 410 is annotated in FIG. 4A, although one of skill in the art would understand that each microgroove of the current embodiment is substantially the same profile and element 410 refers to each such microgroove. In various embodiments, non-uniform profiles may be used where advantages are presented by such profiles.

Figure 4B:
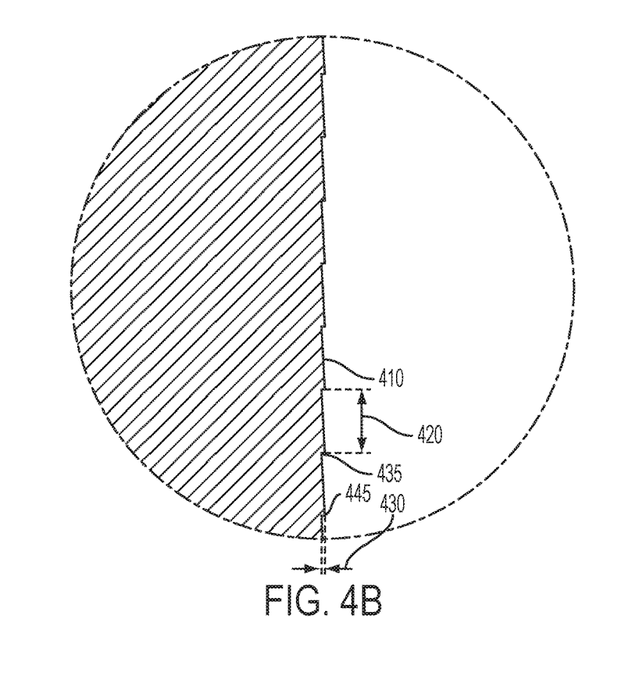
FIG. 4B is a detail view of detail 4B as indicated in FIG. 4A.
Figure 5:
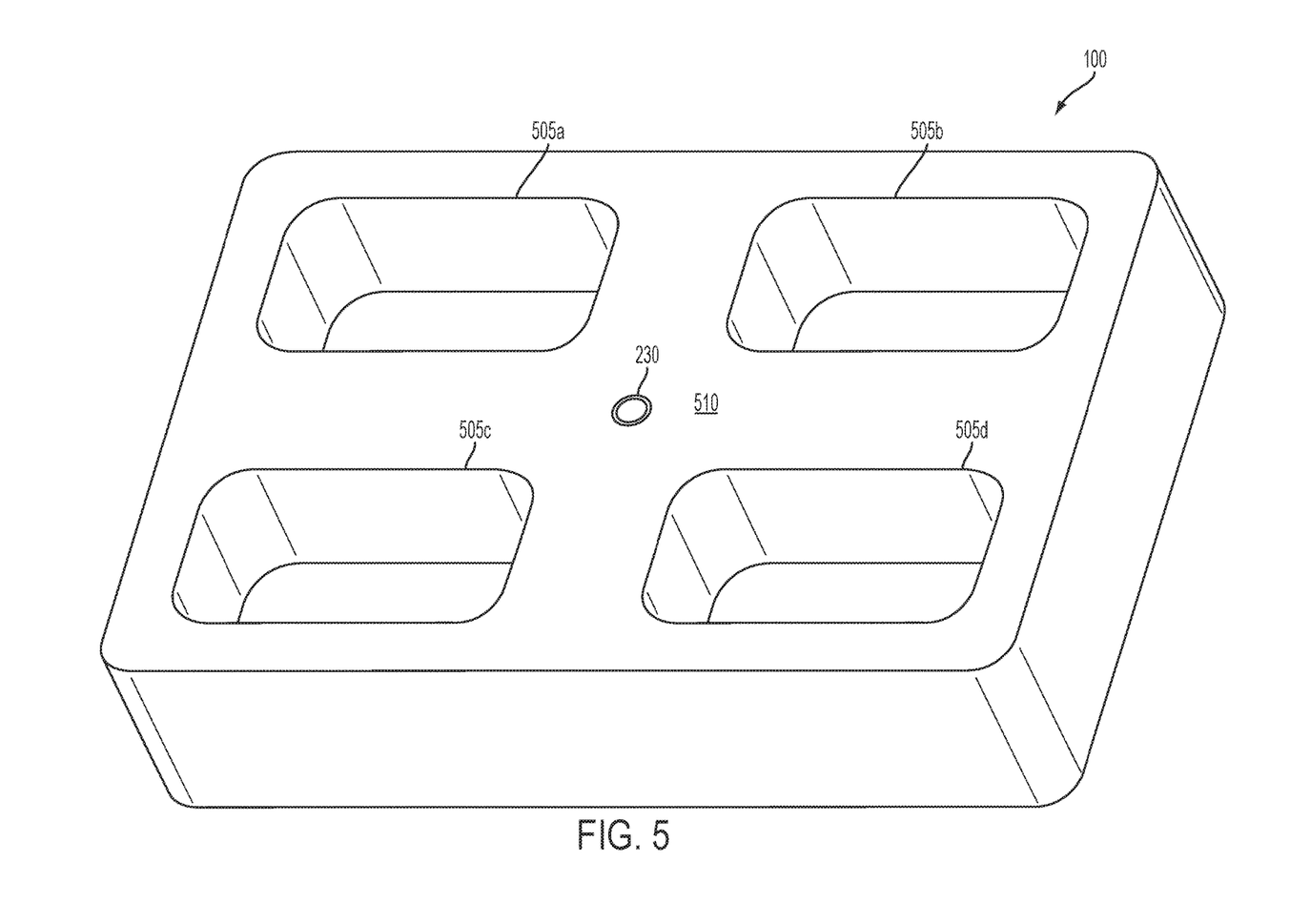
FIG. 5 is a rear perspective view of the master mold of FIG. 1.

The microgrooves 410 are shown in greater detail with reference to FIG. 4B. Although the microgrooves 410 are located on a radius (as indicated above with reference to FIG. 2), current views at the micron level may appear substantially flat. As previously noted, each microgroove 410 is substantially the same in the current embodiment. Each microgroove 410 includes a width 420 and a depth 430. In the current embodiment, the microgrooves 410 form a stair-step pattern, with the depth of each microgroove 410 being deepest at an uppermost end 435 of each microgroove 410. Each microgroove 410 becomes linearly shallower until its lowermost end 445. At the lowermost end 445, each microgroove 410 terminates and begins another microgroove 410 with a new uppermost end 435. The pattern described above repeats until a groove such as upper groove 210 or lower groove 215 is encountered. Each groove (210, 215) is of a depth of about 0.10 mm and of a width of about 0.605 mm. Each microgroove 410 is of a depth 430 of about 18 μm and of a width of about 400 μm. In various embodiments, groove depths range from 0.07 mm to 0.13 mm, groove widths range from 0.585 mm to 0.625 mm. Microgroove depths range from about 14 μm to 22 μm. In various embodiments, microgroove depths range from 10 μm to 30 μm. In various embodiments, microgroove depths range from 1 μm to 40 μm. Microgroove widths range from 380 μm to 420 μm. In various embodiments, microgroove widths range from 300 μm to 500 μm A rear view of the master mold 100 is shown with reference to FIG. 5. Four ports 505a,b,c,d are seen located in a rear surface 510 of the master mold 100. Additionally, the notch 230 is seen centrally located in the rear surface 510. In various embodiments, the notch 230 may be threaded for handling.

When the details described above are produced in a master mold 100—typically via CNC—the master mold 100 includes details substantially the same as the desired composite face plate. As such, phenolic molds produced by the master mold 100 contain reverse details that are then re-reversed to create the composite face plate.

Figure 6:
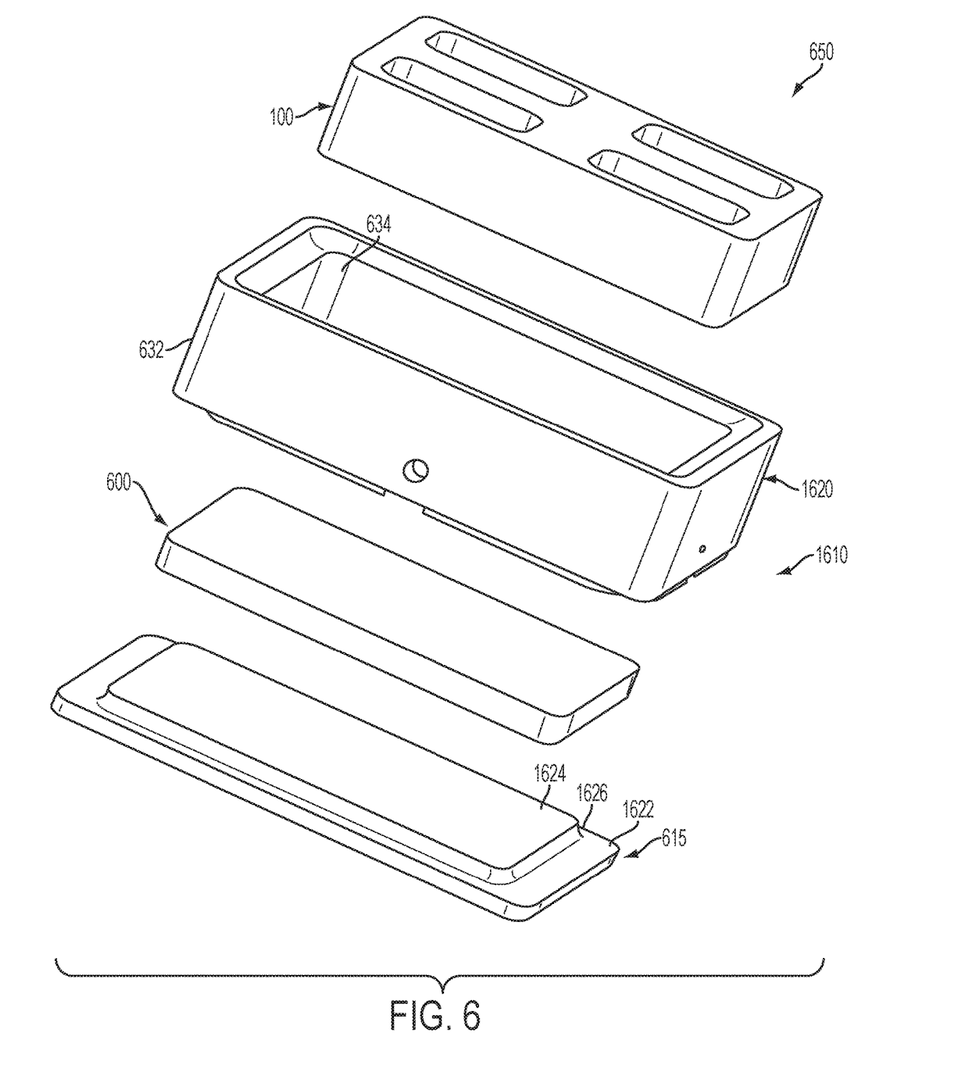
FIG. 6 is an exploded perspective view of a mold assembly including the master mold of FIG. 1 and a formed phenolic mold in accord with one embodiment of the current disclosure.

To make the mold 600 (as seen in FIG. 6) of the current embodiment, phenolic material (such as Plenco 2311, 2739, 4349, 6401, and 6553, available at Plastic Engineering Company, 3518 Lakeshore Road, P.O. Box 758, Sheboygan, Wis. 53082) is used. The phenolic material is supplied in powder form or flake form. To provide consistent amounts of phenolic material for processing, a mass of about 100-200 grams of phenolic material is compacted into a preform, although various masses may be utilized depending on the desired application and the desired dimensions of the mold 600. Each preform is about three inches in diameter and about 1.5 inches in thickness. The phenolic material is compacted under 20 tons of force to form the preform. In varying embodiments, various materials may be used to achieve similar results, and the disclosure should not be construed to limit the procedures described herein to phenolic materials only.

To create the mold 600 of the current embodiment, at least two preforms are placed into a mold structure 1610. In varying embodiments, varying numbers of preforms may be used as needed. In varying embodiments, it may be desirable to place the phenolic material directly into the mold structure 1610 as opposed to preforming the phenolic material. The mold structure 1610 includes a mold base 615 and a wall structure 1620. The mold base 615 and the wall structure 1620 are typically machined steel, although various embodiments may be various materials, including machined aluminum and various machined materials—including machined phenolic. The mold base 615 includes an edge portion 1622 and a central portion 1624 separated by a step 1626. The central portion 1624 is sized about the same size at the desired dimensions of the mold 600, which, in the current embodiment, is about the same as the master mold 100. The wall structure 1620 includes a shell 632 that defines a cavity 634. The cavity 634 is sized about the same as the master mold 100, the desired dimensions of the mold 600, and the central portion 1624. As such, the shell 632 is sized to surround and to define the dimensions of the mold 600. The master mold 100 and the mold structure 1610 together define the mold assembly 650.

Preforms are preheated to 210° F., and the mold assembly 650 is preheated to 315° F. with RF heating. However, various heating methods and temperatures may be used in various processes, including RF heating, oven heating, microwave heating, conduction, convection, and various other methods where applicable. Additionally, various temperatures between 200° F.-300° F. may be used. Phenolic material deforms to a paste-link consistency which can be flowed into the mold cavity to fill the microtextured master mold 100. As such, the microtexture surface details can be molded into the phenolic material upon curing.

When the preforms are placed into the cavity 634 of the mold structure 1610, the master mold 100 acts as a plunger to compress the preforms and shape them to the desired structure. The master mold 100 compresses the preforms at about 14 tons force for cycles of 5-30 minutes. In various embodiments, forces between 10-25 tons, may be used. Additional RF heating may be included in the compression and processing of the preforms. In various embodiments, breathe cycles may be included as well to allow cyclical forming of the preforms into the mold 600. In various embodiments, one to five breathe cycles may be included. The mold 600 is allowed a 5-minute cure in the mold assembly 650. Finally, the mold assembly 650 is released and the mold 600 is completed. It should be noted that FIG. 6 includes the exploded view of the mold 600 after completion of the forming process via compression in the mold assembly 650.

If continuously processed, the procedure above can produce about 3-6 molds per hour. However, various modifications to the process may reduce or increase cycle time. It should be noted that various modifications to the process are contemplated by this disclosure and are considered to be included therein.

A view of the mold 600 is seen with reference to FIGS. 7A-7E. As can be seen, the mold 600 includes its own surface details 610. The shim 620 is also seen (as formed by the shim mold 162). The shim 620 provides an edge surrounding an area into which the polyurethane material is formed as described above. The shim 620 is of about constant thickness in the current embodiment, although various thicknesses may be utilized. Under pressure, the shim 620 sets an about constant thickness for the polyurethane material to be molded to the composite face blank.

Figure 7A:
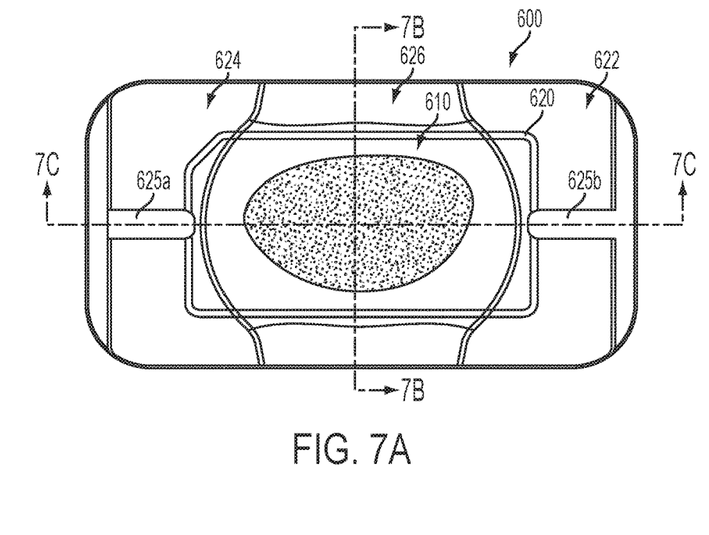
FIG. 7A is a front side view of a mold in accord with one embodiment of the current disclosure.

The mold 600 includes a first region 622, a second region 624, and a third region 626 generally corresponding to the first region 122, the second region 124, and the third region 126 on the master mold 100. An ejection feature may be included in various embodiments of the mold 600 to allow separation of the molded composite face plate from the mold 600. In the current embodiment, the ejection feature includes two ejection slots 625a,b arranged in the second region 624 and the first region 622, respectively, although various arrangements may be used. The ejection slots 625a,b provide a region into which a tool may be inserted behind the composite face plate such that the composite face plate may be pried from the mold 600 if needed. In various embodiments, the ejection feature may include various mechanisms as known in the art for ejection. In the current embodiment, the ejection slots 625a,b are post-processed into the mold 600—for example, by machining—although in various embodiments the ejection slots 625a,b may be features seen in the master mold 100 that become molded into the mold 600. In the current embodiment, the ejection slots 625a,b extend beyond the shim 620 to allow any tool to pry beneath the composite face plate. In various embodiments, the ejection slots 625a,b may not extend beyond the shim 620. For example, in embodiments where the composite face plate extends outside the shim 620 it may be possible to eject the composite face plate without an ejection slot 625a,b extending beyond the shim 620.

Figures 7B, 7D, 7E:
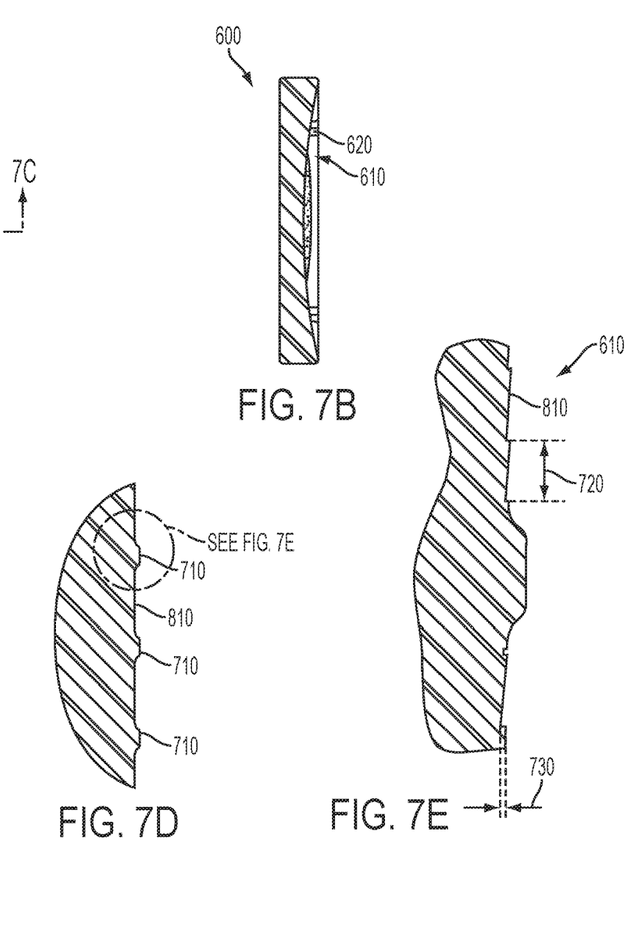
FIG. 7B is a cross-sectional view of the mold of FIG. 7A.
FIG. 7D is a detail view of the cross-section shown in FIG. 7B.
FIG. 7E is a detail view of the detail shown in FIG. 7D.
Figure 7C:
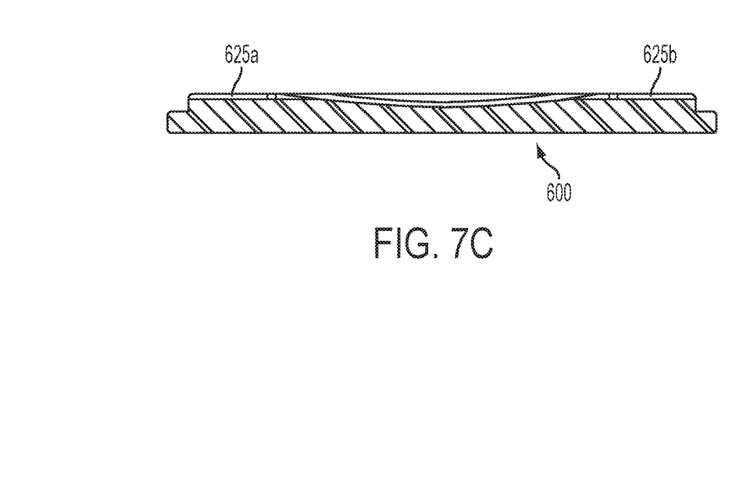
FIG. 7C is a cross-sectional view of the mold of FIG. 7A.

FIGS. 7B-7E include various views of the mold 600, including detailed views showing the surface details 610 of the mold 600 as being reproduced from the master mold 100. With reference to FIG. 7D, upper groove formations 710 can be seen as corresponding with the upper grooves 210 of the master mold 100. Although not shown, lower groove formations correspond with lower grooves 215 of the master mold 100 as well. The detail view of FIG. 7E shows that the surface details 610 include microgrooves 810 corresponding to microgrooves 410 and having a width 720 and a depth 730 that is substantially the same as the width 420 and the depth 430, although the orientation of the microgrooves 810 are reversed from microgrooves 410 due to molding. When forming the polyurethane layer of the composite face plate, microgrooves formed into the polyurethane are reversed from the microgrooves 810 such that they are substantially the same profile as microgrooves 410.

Figure 8:
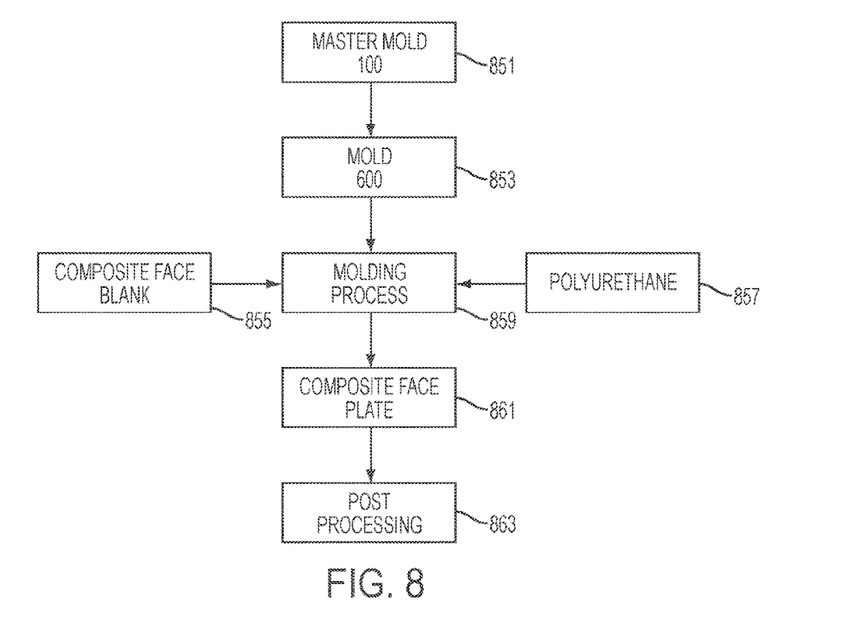
FIG. 8 is a flow diagram illustrating a process in accord with one embodiment of the current disclosure.

In general, the process of creating a composite face plate is described with reference to FIG. 8. In various embodiments, the master mold 100 is obtained as shown in step 851. In various embodiments, the master mold 100 may be fabricated, obtained from a third party, or formed as part of the process. The master mold 100 is used to create the mold 600 as seen with reference to step 853 using the processes described above, among other processes known in the art. A composite face blank is obtained as shown with reference to step 855. In various embodiments, the composite face blank may be fabricated, obtained from a third party, or formed as part of the process. Polyurethane or similar cover layer material is obtained as shown with reference to step 857. Cover layer materials may be mixed locally to the process or may be prefabricated and cured with additional steps known in the art. In various embodiments, various material processing requirements may allow modification of the processes as described as would be understood by one of skill in the art. As shown with reference to step 859, the composite face blank and polyurethane or cover layer material are combined with the mold 100 in the molding process. Following sufficient amounts of curing time under sufficient conditions as described herein, the composite face plate is formed as seen with reference to step 861. In various embodiments, post processing may occur as seen with reference to step 863. Such post processing may include trimming the composite face plate to final dimensions and cosmetic processing, among other steps.

C. Electroforming

Electroforming is a metal deposition process wherein a cathode and an anode, a master mold, are immersed in an electrolyte which allows dissolved cathode atoms to be deposited onto the master mold. In various embodiments, nickel (Ni) or nickel-cobalt (Ni—Co) may be used as a cathode, although various cathode materials may be used. After sufficient thickness is built up, the cathode deposition forms a shell that can be removed from the anode. In the current embodiment, the master mold anode can be used to form cathode shell molds. In various embodiments, the cathode shell molds provide sufficient strength and durability to withstand the polyurethane molding processes described above.

Depending on thickness desired, typical cycle time is between 1 and 3 hours per part. In general the thickness of an electroformed part is on the order of 0.5-1.0 mm, and a support structure is often needed. This structure can be a machine metal stand, or a molded phenolic piece supported by a metal stand.

The process of electroforming can be found in greater detail in U.S. patent application Ser. No. 13/472,811, filed on May 16, 2012, and entitled "GOLF CLUB HEAD WITH FACE INSERT," which is incorporated by reference herein in its entirety and with specific reference to the process of electroforming surface profiles.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A mold comprising:
   a first region, a second region, and a third region situated between the first region and the second region;
   a mold surface located in the third region; and
   surface details located on the mold surface, wherein at least a portion of the surface details includes a plurality of recessed grooves and a plurality of recessed microgrooves located between the plurality of recessed grooves, wherein the plurality of recessed grooves are deeper than the plurality of recessed microgrooves;
   wherein the mold consisting essentially of a phenolic material and withstanding at least two tons of force for at least two cycles.

2. The mold of claim 1, wherein the third region includes a curvature that substantially matches a predefined roll radius and a predefined bulge radius of a golf club face.

3. The mold of claim 1, wherein the surface details are located within a first rim, and a second rim is located within the first rim and generally follows a contour of the first rim, wherein each of the first and second rims provides an angled trough located therebetween such that the first rim, the second rim, and the trough together form a shim mold.

4. The mold of claim 3, wherein each of the first and second rims is generally rectangular in shape except for having a keyed corner.

5. The mold of claim 1, further comprising a first ejection feature located in the first region and a second ejection feature located in the second region, wherein the first and second ejection features are configured to create respective ejection slots in an offspring mold produced by the mold, wherein the offspring mold contains reverse details mirroring the surface details of the mold.

6. The mold of claim 1, further comprising a characteristic time (CT) test pad located between two adjacent grooves.

7. The mold of claim 6, wherein at least some of the plurality of microgrooves are located on the CT test pad.

8. The mold of claim 1, wherein each microgroove has a first end and a second end, the microgroove having a largest depth relative to the surface at the first end and becoming linearly shallower until the second end.

9. The mold of claim 1, wherein consecutive microgrooves between two adjacent grooves form a repeating stair-step pattern.

10. The mold of claim 9, wherein the repeating stair-step pattern terminates at any one of the two adjacent grooves.

11. The mold of claim 1, wherein each groove has a depth ranging from 0.07 mm to 0.13 mm and a width ranging from 0.585 mm to 0.625 mm.

12. The mold of claim 11, wherein each groove has a depth about 0.10 mm and a width about 0.605 mm.

13. The mold of claim 1, wherein each microgroove has a depth ranging from 1 µm to 40 µm and a width ranging from 300 µm to 500 µm.

14. The mold of claim 13, wherein each microgroove has a depth ranging from 14 µm to 22 µm and a width ranging from 380 µm to 420 µm.

15. The mold of claim 14, wherein each microgroove has a depth about 18 µm and a width about 400 µm.

16. The mold of claim 1, wherein the plurality of microgrooves have non-uniform profiles.

* * * * *